(12) United States Patent
    Ito et al.

(10) Patent No.: US 9,981,544 B2
(45) Date of Patent: May 29, 2018

(54) ELECTRIC WORK VEHICLE

(71) Applicant: Kubota Corporation, Osaka (JP)

(72) Inventors: Hirokazu Ito, Sakai (JP); Kazuo Koike, Sakai (JP)

(73) Assignee: Kubota Corporation, Osaka (JP)

( * ) Notice: Subject to any disclaimer, the term of this patent is extended or adjusted under 35 U.S.C. 154(b) by 64 days.

(21) Appl. No.: 14/956,693

(22) Filed: Dec. 2, 2015

(65) Prior Publication Data

US 2016/0297293 A1    Oct. 13, 2016

(30) Foreign Application Priority Data

Apr. 8, 2015    (JP) ................. 2015-079360

(51) Int. Cl.
    *B60K 11/00*    (2006.01)
    *B60K 11/04*    (2006.01)
    *B60K 1/02*     (2006.01)
    *B60K 7/00*     (2006.01)
    *B60K 1/04*     (2006.01)
    *B60L 11/18*    (2006.01)
    *B60K 1/00*     (2006.01)

(52) U.S. Cl.
    CPC ............ B60K 11/04 (2013.01); B60K 1/02 (2013.01); B60K 1/04 (2013.01); B60K 7/0007 (2013.01); B60L 11/1851 (2013.01); B60K 2001/003 (2013.01); B60K 2001/006 (2013.01); B60K 2001/0416 (2013.01); B60K 2007/0061 (2013.01)

(58) Field of Classification Search
    CPC ........ B60K 11/04; B60K 1/02; B60K 7/0007; B60K 2001/006; B60K 2001/003; B60W 2300/156; B60W 2510/085; B60W 2510/087; B60W 2520/18; F01P 7/00; F01P 2007/146
    See application file for complete search history.

(56) References Cited

U.S. PATENT DOCUMENTS

| 7,211,913 | B2* | 5/2007 | Tsutsui ................. B60K 6/48 310/52 |
| 8,191,342 | B2* | 6/2012 | Ishii .................... A01D 34/44 56/11.9 |
| 2003/0098077 | A1* | 5/2003 | McLane ............. B60H 1/00485 137/625.47 |
| 2006/0048984 | A1 | 3/2006 | Pleune et al. |

(Continued)

FOREIGN PATENT DOCUMENTS

| DE | 102013220772 A1 | 4/2014 |
| EP | 2667053 A2 | 11/2013 |

(Continued)

*Primary Examiner* — James A Shriver, II
*Assistant Examiner* — Steve Clemmons
(74) *Attorney, Agent, or Firm* — The Webb Law Firm (57) ABSTRACT

An electric work vehicle includes a left motor 4L that drives a left drive wheel 12L and a right motor 4R that drives a right drive wheel 12R, a cooling liquid circulation flow path 7 connected to the left motor 4L and the right motor 4R, and a cooling liquid distribution mechanism 6 that, according to a travel state, adjusts a ratio between a cooling liquid flow amount that flows from a pump 72 disposed on the cooling liquid circulation flow path 7 to the left motor 4L, and a cooling liquid flow amount that flows from the pump 72 to the right motor 4R.

5 Claims, 6 Drawing Sheets

(56) References Cited

U.S. PATENT DOCUMENTS

2007/0120427 A1    5/2007   Lund et al.
2013/0268165 A1   10/2013   Hashima et al.

FOREIGN PATENT DOCUMENTS

| JP | 2004260969 A | | 9/2004 |
|----|--------------|---|--------|
| JP | 2010277815 A | | 12/2010 |
| JP | 2011225134 A | * | 11/2011 |
| JP | 201363092 A | | 4/2013 |
| JP | 2013192311 A | | 9/2013 |
| JP | 2014225939 A | | 12/2014 |

* cited by examiner

ELECTRIC WORK VEHICLE

CROSS-REFERENCE TO RELATED APPLICATION

This application claims priority to Japanese Patent Application No. 2015-079360 filed Apr. 8, 2015, the disclosure of which is hereby incorporated in its entirety by reference.

BACKGROUND OF THE INVENTION

Field of the Invention

The present invention relates to an electric work vehicle with a left-rear wheel that is driven by a left motor and a right-rear wheel that is driven by a right motor.

Description of the Related Art

JP 2013-63092A discloses a riding-type lawn mower that is provided with two electric motors that independently drive two drive wheels (a left and right pair of drive wheels), and a single refrigerant pump provided on a refrigerant flow path for cooling the two electric motors. With this lawn mower, the two electric motors are both cooled by refrigerant that is circulated in the refrigerant flow path by the single refrigerant pump.

However, with a work vehicle including the lawn mower, inclined surfaces are traveled across on many occasions. In inclined surface travel, a larger travel load is applied to the driving wheel on the lower side of the inclined surface than to the driving wheel on the upper side of the inclined surface, and a larger load is applied to the electric motor that drives the driving wheel on the lower side of the inclined surface, as a result of which the temperature thereof increases. Accordingly, in inclined surface travel, it is not efficient to uniformly supply cooling liquid to the left and right electric motors. Also, even when not travelling across an inclined surface, in the case of a work vehicle, a travel state also occurs in which the right driving wheel and the left driving wheel receive different travel resistances, and this kind of travel state is not considered in motor cooling.

SUMMARY OF THE INVENTION

In view of the foregoing circumstances, there is desire for an electric work vehicle with an improved cooling structure for the left motor that drives the left-rear wheel and the right motor that drives the right-rear wheel.

An electric work vehicle according to one aspect of the present invention includes a left motor that drives a left drive wheel; a right motor that drives a right drive wheel; a cooling liquid circulation flow path connected to the left motor and the right motor; a radiator and a pump disposed on the cooling liquid circulation flow path; and a cooling liquid distribution mechanism configured to, according to a travel state, adjust a ratio between a cooling liquid flow amount that flows from the pump to the left motor and a cooling liquid flow amount that flows from the pump to the right motor.

With this configuration, the cooling liquid distribution mechanism causes more cooling liquid to flow to one of the left motor and the right motor, thereby yielding a greater cooling effect than in the other motor. With the work vehicle, a larger travel load is generated in one of the left and right wheel traveling across the inclined surface, and a larger load is applied to the motor that drives that wheel, as a result of which motor heating increases. The cooling liquid distribution mechanism can adjust the ratio between the cooling liquid flow amount that flows to the left motor and the cooling liquid flow amount that flows to the right motor, according to the travel state. Accordingly, if a travel state occurs in which the travel load is biased toward the left or right wheel, more cooling liquid flows to the motor in which more motor heating occurs, whereby efficient cooling is realized.

Examples of travel states that are control factors for the cooling liquid distribution mechanism to adjust the cooling liquid ratio include the inclination angle of the travel route surface, the inclination angle of the traveling vehicle body, motor temperature, motor load, wheel load, change in the center of gravity of the vehicle body, and the like. It is preferable that an appropriate factor among these is selected and used as the control factor for adjusting the cooling liquid ratio.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
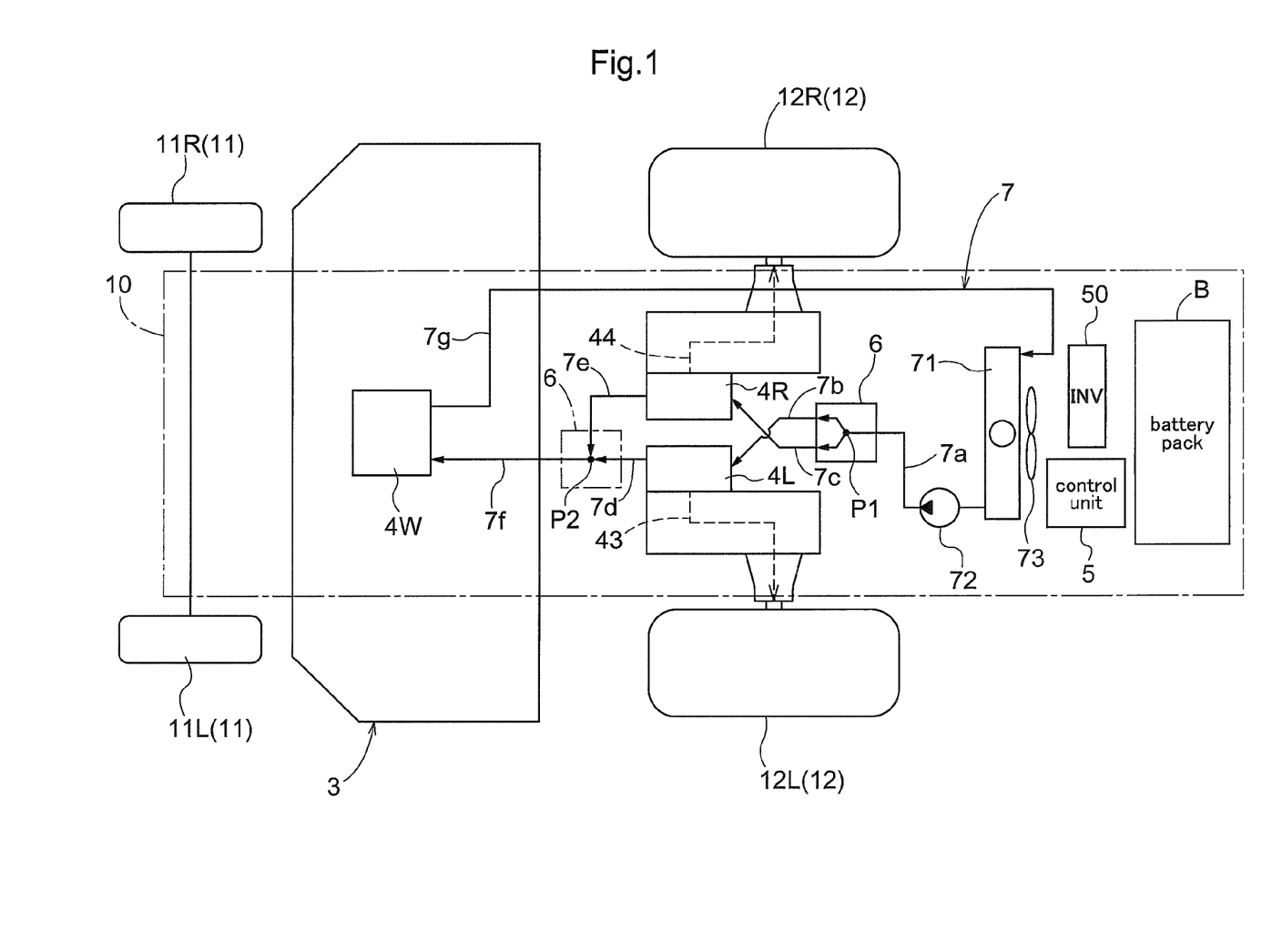
FIG. 1 is a diagram illustrating a basic configuration for motor cooling by means of circulated coolant.

Before describing specific embodiments of the electric work vehicle relating to the present invention, FIG. 1 will be used to describe a basic configuration of a motor cooling system mounted in an electric work vehicle.

The front portion of a vehicle body 10 of the electric work vehicle supports a left-front wheel 11L and a right-front wheel 11R, and the rear portion of the vehicle body 10 supports a left-rear wheel 12L and a right-rear wheel 12R. In the example shown in FIG. 1, the left-rear wheel 12L is driven by receiving power from a left motor 4L via a left transmission mechanism 43. The right-rear wheel 12R is driven by receiving power from a right motor 4R via a right transmission mechanism 44. The left motor 4L and the right motor 4R independently receive supplies of electricity from a battery pack B via an inverter 50 that operates based on a control signal from a control unit 5. The left-rear wheel 12L and the right-rear wheel 12R are drive wheels that can be driven independently of each other. Accordingly, the left-rear wheel 12L is a left drive wheel and the right-rear wheel 12R is a right drive wheel. Also, hereinafter, if there is no particular need for distinction, the term "front wheels 11" will be used as a collective term for the left-front wheel 11L and the right-front wheel 11R, and the term "rear wheels 12" will be used as a collective term for the left-rear wheel 12L and the right-rear wheel 12R.

A work apparatus 3 is mounted on the vehicle body 10 of the electric work vehicle. In the example shown in FIG. 1, the work apparatus 3 is provided with a work motor 4W, but this is not a mandatory component of the present invention and can be omitted. The work motor 4W also receives a supply of electricity from the battery pack B via the inverter 50.

The left motor 4L and the right motor 4R are provided with water jackets that form cooling liquid flow paths for cooling. The motor cooling system includes a cooling liquid circulation flow path 7 that is connected to the left motor 4L and the right motor 4R. A radiator 71, a pump 72, and the cooling liquid distribution mechanism 6 are disposed on the cooling liquid circulation flow path 7. The cooling liquid distribution mechanism 6 has a function of adjusting the ratio between the cooling liquid flow amount that flows from the pump 72 to the left motor 4L and the cooling liquid flow amount that flows from the pump 72 to the right motor 4R according to a travel state. The battery pack B is mounted on the rearmost portion of the vehicle body 10 as the power source for the left motor 4L and the right motor 4R. A cooling fan 73 that cools the cooling liquid passing through the radiator 71 is driven by an electric motor that receives a supply of electricity from the battery pack B.

Moreover, the work motor 4W also receives a supply of electricity from the battery pack B and the above-described cooling liquid circulation flow path 7 is connected to the water jacket of the work motor 4W as well.

In the cooling liquid circulation flow path 7, a branching point P1 is provided on a first flow path 7a connected to a discharge opening of the pump 72, such that the cooling liquid circulation flow path 7 branches out into a second flow path 7b and a third flow path 7c. The second flow path 7b is connected to the inlet of the left motor 4L, and the third flow path 7c is connected to the inlet of the right motor 4R. A fourth flow path 7d is connected to an outlet of the left motor 4L, a fifth flow path 7e is connected to an outlet of the right motor 4R, and the fourth flow path 7d and fifth flow path 7e merge at a merging point P2 and connect to a sixth flow path 7f. The sixth flow path 7f is connected to a suction opening of the pump 72 as a return flow path, but in the example shown in FIG. 1, the work motor 4W is disposed on the return flow path. Accordingly, the sixth flow path 7f is connected to an inlet of the work motor 4W, and a seventh flow path 7g passes through the radiator 71 on the way to the pump 72 and is connected to the suction opening of the pump 72.

In the example shown in FIG. 1, the cooling liquid distribution mechanism 6 is provided at the branching point P1. The cooling liquid distribution mechanism 6 operates such that based on a travel state in which the motor heat amounts generated by the left motor 4L and the right motor 4R are different, more cooling liquid flows to the motor with the larger generated motor heat amount, and less cooling liquid flows to the motor with the smaller generated motor heat amount.

It is also possible to provide the cooling liquid distribution mechanism 6 at the merging point P2, and this is implied by the inclusion of the single-point chain line in FIG. 1. In other words, the cooling liquid amounts that flow in the left motor 4L and the right motor 4R are changed as a result of restricting the cooling liquid amounts that flow from the left motor 4L and the right motor 4R.

One preferred embodiment of the cooling liquid distribution mechanism 6 is a distribution valve that makes the cooling liquid flow amount to the motor that drives the drive wheel located on the lower side of an inclination greater than the cooling liquid flow amount to the motor that drives the drive wheel located on the upper side of the inclination. Accordingly, the travel state is the inclination angle in the vehicle body transverse direction of the traveling vehicle body. In this case, it is preferable that if the inclination angle is less than or equal to a predetermined angle, the cooling liquid flow amounts to the left and right motors are kept at a predetermined flow amount, if the inclination angle exceeds the predetermined angle, a flow amount that is less than the predetermined flow amount flows to the motor that drives the drive wheel located on the upper side of the inclination, and if the inclination angle exceeds the predetermined angle, a flow amount that is greater than the predetermined flow amount flows to the motor that drives the drive wheel located on the lower side of the inclination.

Another preferred embodiment of the cooling liquid distribution mechanism 6 is a distribution valve that makes the cooling liquid flow amount to the motor with the higher motor temperature greater than the cooling liquid flow amount to the motor with the lower motor temperature. Accordingly, the travel state is the motor temperature. In this case, a thermo-valve that switches valves according to the motor temperature may be used as the distribution valve, or an electromagnetic valve that is switched ON or OFF based on detection results of a temperature sensor may be used as the distribution valve.

Yet another preferred embodiment of the cooling liquid distribution mechanism 6 is a distribution valve that makes the cooling liquid flow amount to the motor with the higher motor load greater than the cooling liquid flow amount to the motor with the lower motor load. Accordingly, the travel state is the motor load, which is calculated according to the motor current. In this embodiment, an electromagnetic valve that is switched ON or OFF based on the motor current detection results is used.

Figure 2:
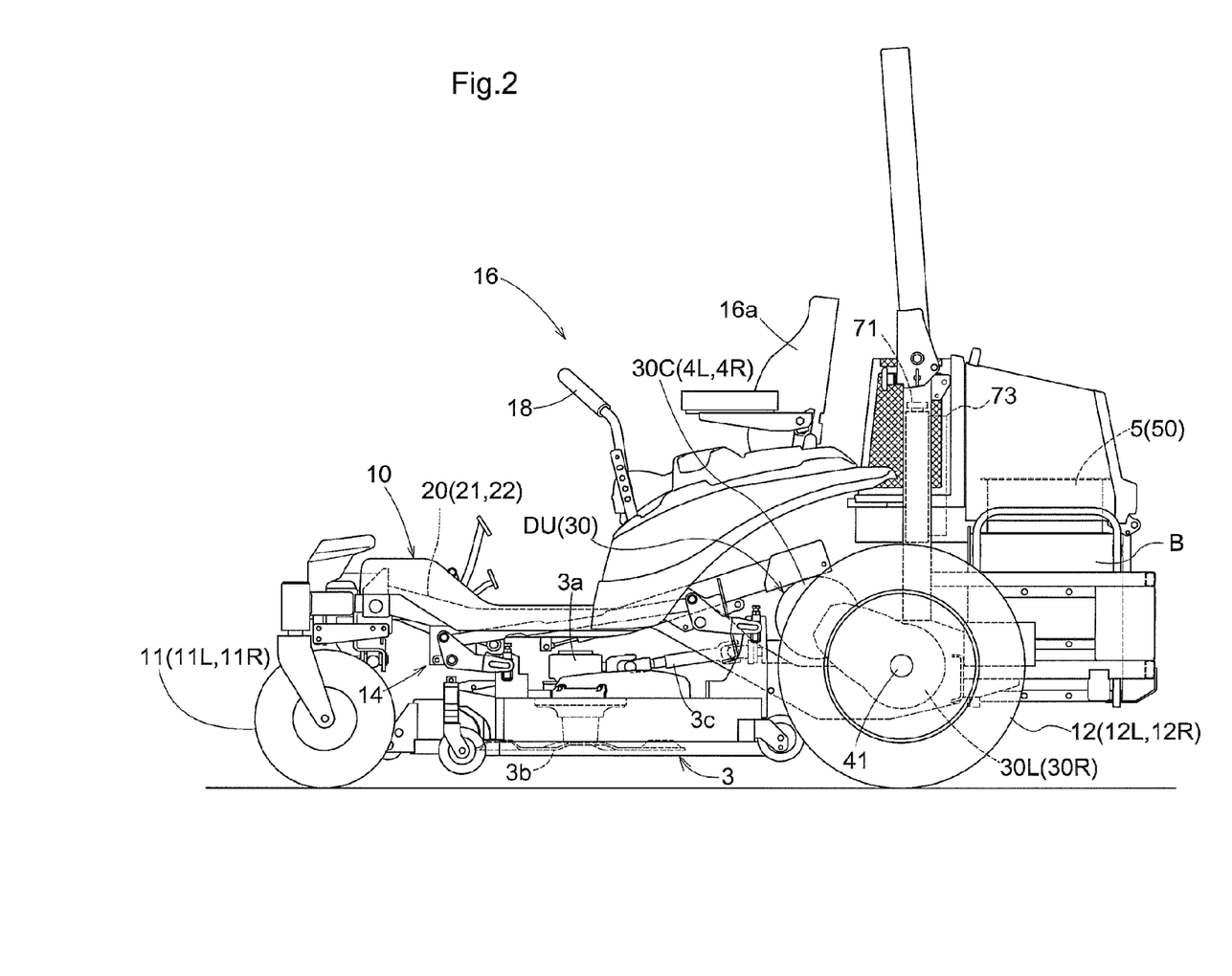
FIG. 2 is a side view showing an electric mower that is one embodiment of the electric work vehicle relating to the present invention.
Figure 3:
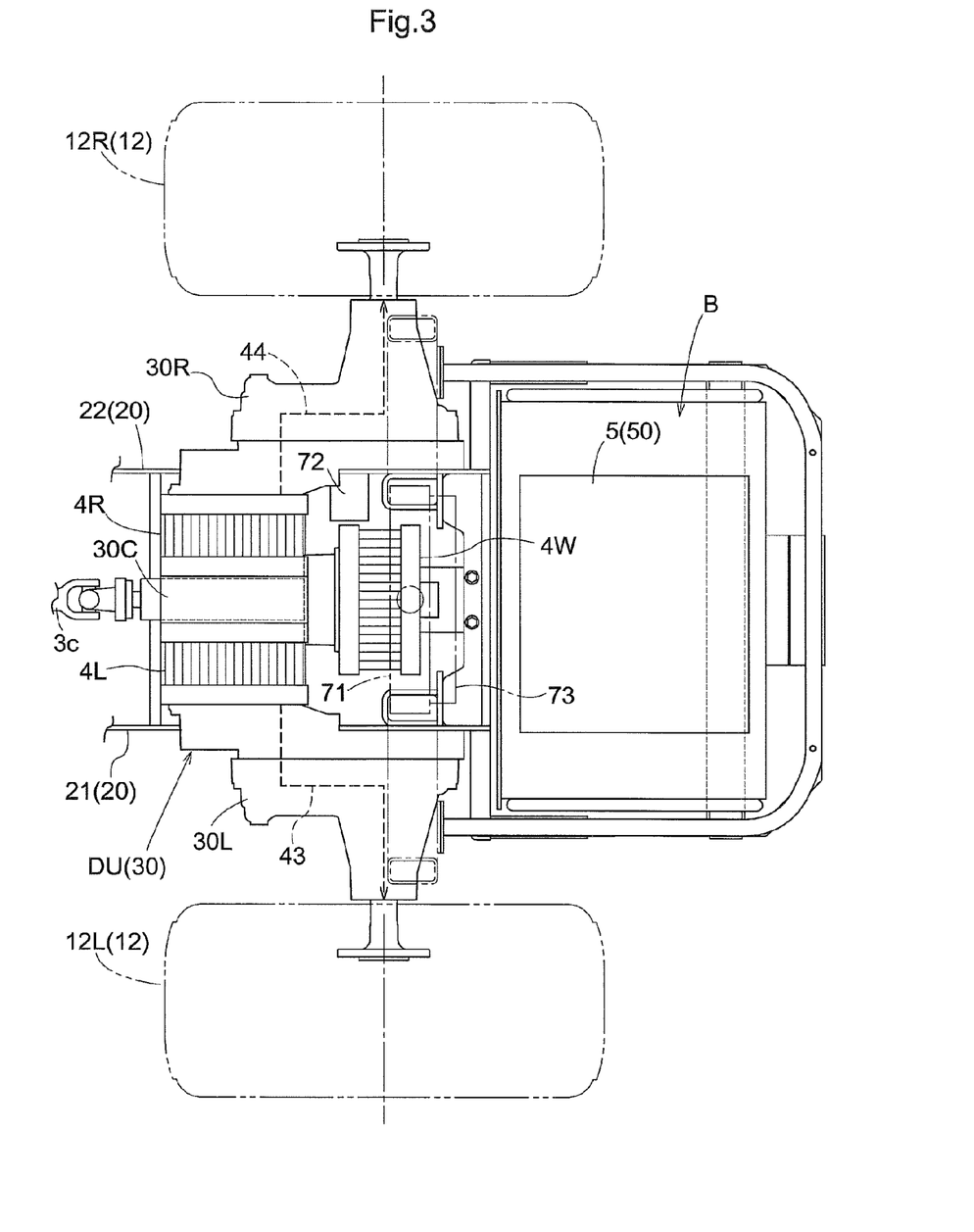
FIG. 3 is a plan view showing a driving system of the electric mower.

Next, a specific embodiment of an electric work vehicle employing the basic principles of the above-described motor cooling system will be described hereinafter. In this embodiment, the electric work vehicle is a riding-type electric mower (hereinafter referred to as simply "mower") with a vehicle body on which a mower unit is equipped as the work apparatus 3. Accordingly, the mower unit will be denoted by reference numeral 3 below. FIG. 2 is a side view of the mower. FIG. 3 is a plan view of a region in which the left motor 4L, the right motor 4R, and the work motor 4W of the mower are arranged.

The mower includes a vehicle body 10 that is supported with respect to the ground by a left and right pair of front wheels 11 and a left and right pair of rear wheels 12 serving as drive wheels that are driven so as to rotate. The vehicle body 10 has a vehicle body frame 20 as a base frame, and the vehicle body frame 20 is composed of a left frame 21 and a right frame 22. Between the front wheels 11 and the rear wheels 12, the mower unit 3 is suspended from the vehicle body frame 20 via a link mechanism 14. The mower unit 3 is provided with a blade transmission mechanism 3a, and a blade 3b that is rotated by the blade transmission mechanism 3a. A driving portion 16 is arranged in a central region in the machine body front-rear direction of the vehicle body 10. For this reason, a driver's seat 16a is arranged via a seat support body in the central region in the machine body front-rear direction of the vehicle body 10.

As shown in FIG. 3, a driving unit DU is arranged between the left frame 21 and the right frame 22 in the rear end region of the vehicle body frame 20. The driving unit DU includes a case structure body 30. The case structure body 30 is gate-shaped in plan view and is composed of a left case portion 30L, which is the left portion thereof, a right case portion 30R, which is the right portion thereof, and a central case portion 30C that connects the left case portion 30L and the right case portion 30R. The rearward portion of the vehicle body frame 20 extends further rearward than the case structure body 30, and the battery pack B is mounted on the rearward portion.

The central case portion 30C functions as a housing for both the left motor 4L that drives the left rear wheel 12 and the right motor 4R that drives the right rear wheel 12. In this embodiment, the water jackets for the left motor 4L and the right motor 4R are formed in the central case portion 30C, and the central case portion 30C receives a supply of cooling liquid through the cooling liquid circulation flow path 7. The cooling liquid circuit in this embodiment is substantially the same as the circuit described with reference to FIG. 1, and therefore description thereof will not be repeated here.

The left transmission mechanism 43 that transmits the power of the left motor 4L to the left-rear wheel 12L and the right transmission mechanism 44 that transmits the power of the left motor 4L to the right-rear wheel 12R are included. The left transmission mechanism 43 is mounted in the left case portion 30L, and the right transmission mechanism 44 is mounted in the right case portion 30R. The left transmission mechanism 43 and the right transmission mechanism 44 have well-known structures, and therefore they are indicated schematically by lines with arrows attached, which indicate the flow of power. Normally, the left transmission mechanism 43 and the right transmission mechanism 44 are constituted by gear pairs, chains, transmission axles, and the like.

The left motor 4L and the right motor 4R are subjected to variable speed driving control independently of each other. Accordingly, linear forward travel is created due to both the left and right rear wheels 12 performing driving in the forward direction at the same or approximately the same speed, and linear reverse travel is created by the left and right rear wheels 12 performing driving in the reverse direction at the same or approximately the same speed. Furthermore, the vehicle body 10 can be turned in any direction by making the speeds of the left and right rear wheels 12 different from each other, and can be turned sharply by one of the left and right rear wheels 12 being set to a low speed close to zero and the other rear wheel 12 being operated at a high speed in the forward direction or the reverse direction. Furthermore, by driving the left and right rear wheels 12 in mutually opposite directions, it is possible to cause the vehicle body 10 to perform a spin turn with an approximately central portion between the left and right rear wheels 12 as the center of revolution. The left and right pair of front wheels 11 are constituted by caster wheels that can change their orientation freely about a vertical shaft center, and therefore the orientations of the left and right pair of front wheels 11 are corrected according to the travel direction determined by the driving of the left and right rear wheels 12.

Gear shift operations for the left motor 4L and the right motor 4R are performed with a left and right pair of gear shift levers 18 that are arranged on both sides of the driver's seat 16a shown in FIG. 2. An idle state is achieved by keeping a gear shift lever 18 at a neutral position in the front-rear direction, forward gear shifting is realized by operating the gear shift lever 18 forward from the neutral position, and reverse gear shifting is realized by operating the gear shift lever 18 rearward.

As shown in FIG. 3, the work motor 4W is arranged in the space surrounded by the central case portion 30C, the left case portion 30L, and the right case portion 30R. A PTO shaft 3c that includes an output shaft and a relay shaft from the work motor 4W extends forward in the vehicle body front-rear direction, and the power from the work motor 4W is transferred to the blade 3b via the blade transmission mechanism 3a of the mower unit 3.

Figure 4:
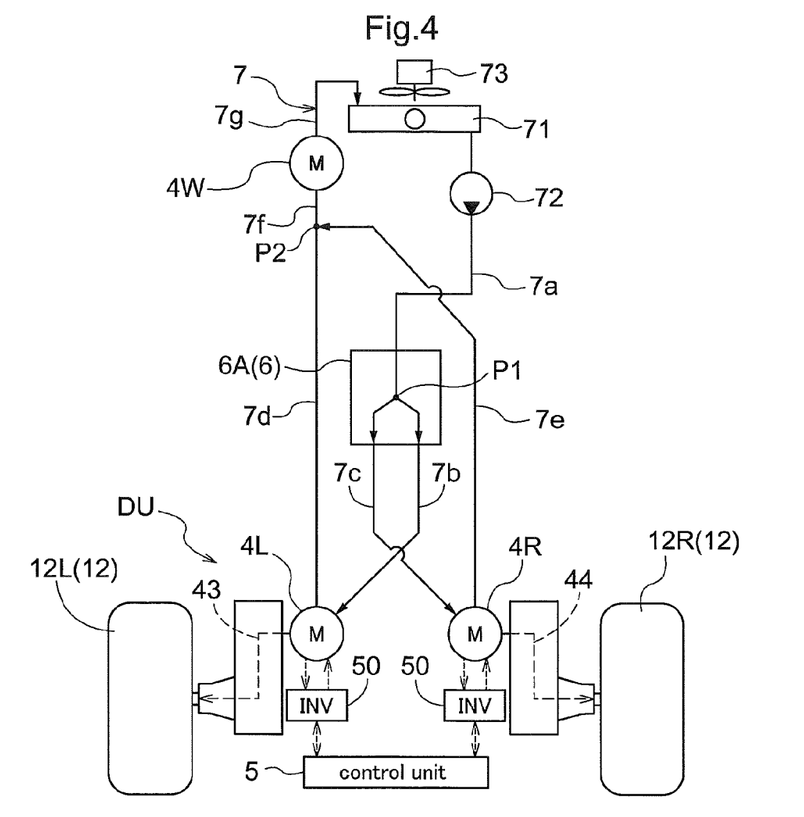
FIG. 4 is a diagram showing a coolant circulation circuit according to a first embodiment of a coolant distribution mechanism.
Figure 5A:
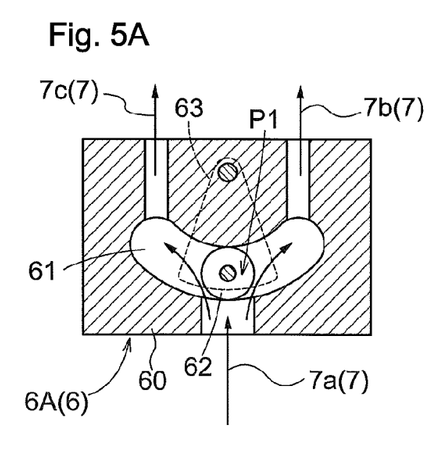
FIG. 5A is a schematic diagram showing a distribution valve according to the first embodiment of the coolant distribution mechanism.
Figure 5B:
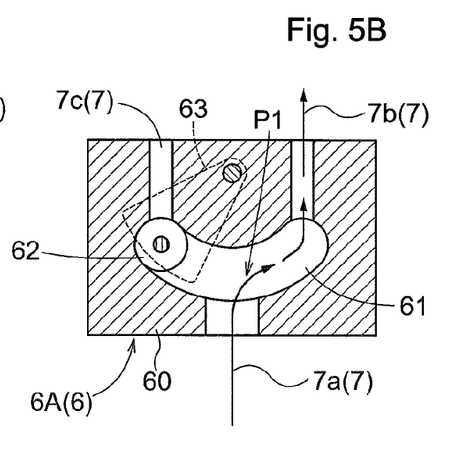
FIG. 5B is a schematic diagram showing a distribution valve according to the first embodiment of the coolant distribution mechanism.

Hereinafter, embodiments of the cooling liquid distribution mechanism 6 will be described with reference to the drawings. A first embodiment is shown in FIGS. 4, 5A, and 5B. In the first embodiment, the cooling liquid distribution mechanism 6 is a distribution valve configured as a pendulum-type inclination response valve 6A. As shown in FIGS. 5A and 5B, the inclination response valve 6A includes a valve housing 60, a valve body 62 accommodated in a valve chamber 61 formed in the valve housing 60, and a pendulum-type inclination operation mechanism 63 that moves the valve body 62 in the valve chamber 61. If the vehicle body 10 tilts to the left, the valve body 62 moves by the action of the inclination operation mechanism 63 such that the flow of cooling liquid between the first flow path 7a and the third flow path 7c is cut off or restricted, as a result of which the supply of cooling liquid to the left motor 4L becomes greater than the supply of cooling liquid to the right motor 4R. If the vehicle body 10 tilts to the right, the valve body 62 moves by the action of the inclination operation mechanism 63 such that the flow of cooling liquid between the first flow path 7a and the second flow path 7b is cut off or restricted, as a result of which the supply of cooling liquid to the right motor 4R becomes larger than the supply of cooling liquid to the left motor 4L (see FIG. 5B). At the neutral position in the inclination response valve 6A shown in FIG. 5A, the supply of cooling liquid to the left motor 4L and the supply of cooling liquid to the right motor 4R are substantially the same.

Figure 6:
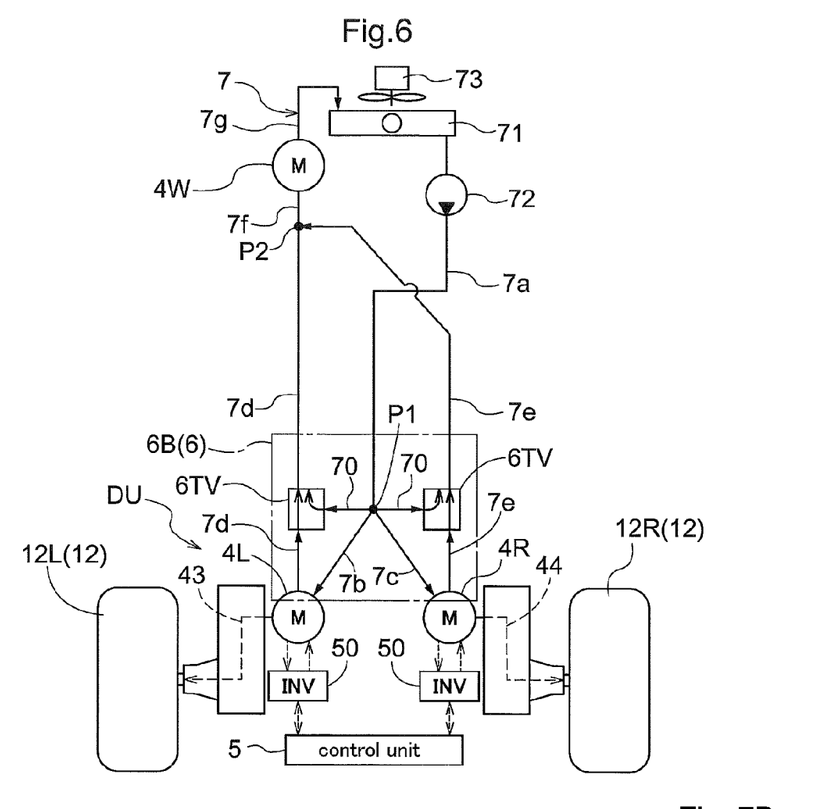
FIG. 6 is a diagram showing a coolant circulation circuit according to a second embodiment of the coolant distribution mechanism.
Figure 7A:
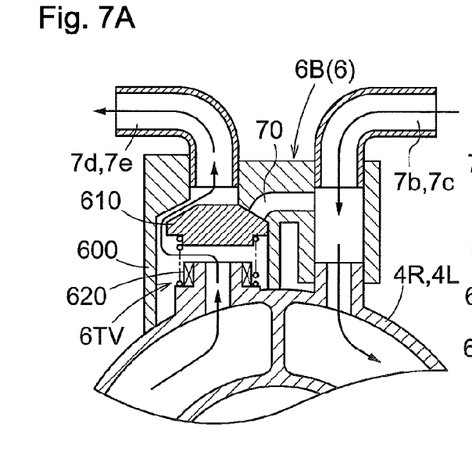
FIG. 7A is a schematic diagram showing a distribution valve according to the second embodiment of the coolant distribution mechanism.
Figure 7B:
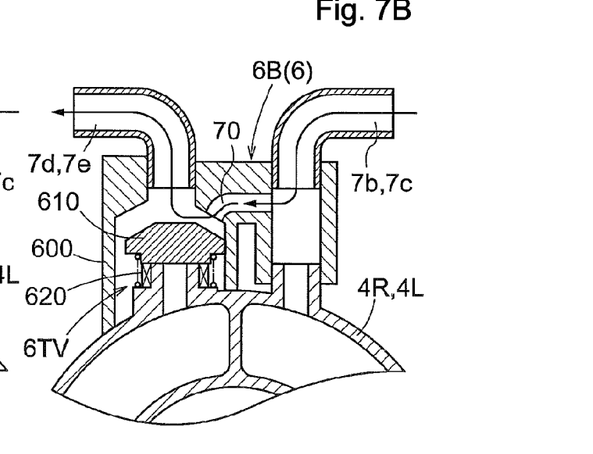
FIG. 7B is a schematic diagram showing a distribution valve according to the second embodiment of the coolant distribution mechanism.

A second embodiment of the cooling liquid distribution mechanism 6 is shown in FIGS. 6, 7A, and 7B. In the second embodiment, the cooling liquid distribution mechanism 6 is a distribution valve configured as a temperature response valve 6B. The temperature response valve 6B is also called a "thermo-valve" and is a valve that opens and closes according to the temperature. Here, temperature response valves 6B are provided in the left motor 4L and the right motor 4R and constitute valve modules 6TV. With the temperature response valves 6B, if the motor heat of one of the left motor 4L and the right motor 4R increases and the temperature rises, the supply of cooling liquid to the water jacket of the other motor is cut off by allowing the cooling liquid to flow through a bypass 70. The supply of cooling liquid to the one motor, that is, the motor with an increased motor temperature, increases due to the supply of cooling liquid to the other motor being cut off. An example of a valve module 6TV is shown in FIGS. 7A and 7B. This valve module 6TV includes a valve housing 600, the bypass 70, which is formed in the valve housing 600, a valve body 610 that shuts and opens the bypass 70, and a temperature response action mechanism 620 that displaces the valve body 610 so as to switch between a position of shutting the bypass 70 (see FIG. 7A) and a position of opening the bypass 70 (see FIG. 7B). The temperature response action mechanism 620 includes a temperature displacement element such as a bimetal as a core constituent member.

Figure 8:
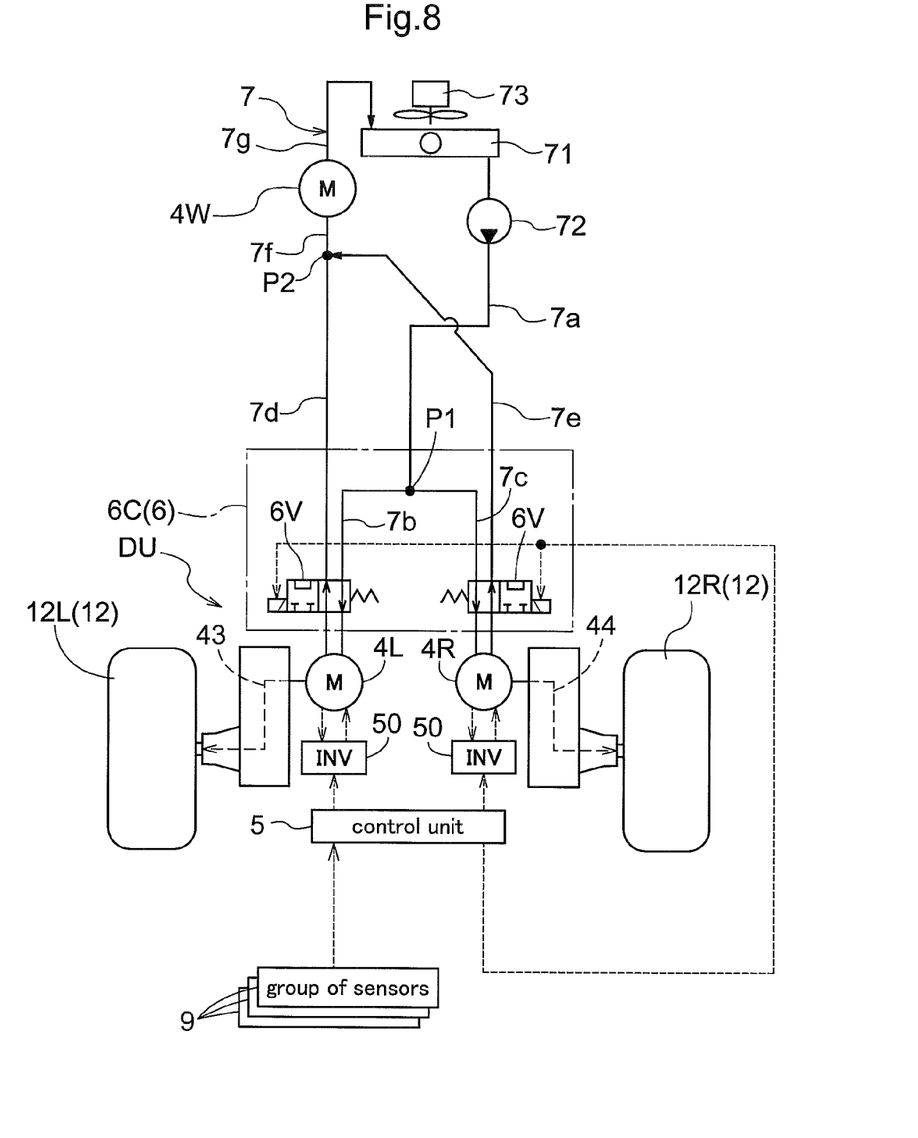
FIG. 8 is a diagram showing a coolant circulation circuit according to a third embodiment of a coolant distribution mechanism.

A third embodiment of the cooling liquid distribution mechanism 6 is shown in FIG. 8. In the third embodiment, the cooling liquid distribution mechanism 6 is configured as a pair of electromagnetic control valves 6V that are controlled by the control unit 5 based on detection signals from a group of sensors 9 that directly or indirectly detect variation in the motor temperature. The detection signals that are used may be for the motor temperature, motor load, inclination of the vehicle body, or the like, but it is advantageous to use detection signals for the motor temperature. The control unit 5 controls the electromagnetic control valve 6V such that if the calculated temperature difference between the motor temperatures of the left motor 4L and the right motor 4R exceeds a predetermined temperature difference, more cooling liquid is supplied to the motor with the higher motor temperature and less cooling liquid is accordingly supplied to motor with the lower motor temperature. Furthermore, if the motor temperatures of both the left motor 4L and the right motor 4R are lower than a predetermined value, the pump load can be reduced by reducing the supply of cooling liquid to both the left motor 4L and the right motor 4R.

In the three embodiments described above, the distribution of the cooling liquid to the work motor 4W was not considered, but it is also possible to change the supply of cooling liquid to the work motor 4W according to the motor temperature or the motor load of the work motor 4W, similarly to the method performed with respect to the left motor 4L and the right motor 4R.

By using a motor cooling system such as that described above, the left motor 4L and the right motor 4R can be cooled regardless of the vehicle speed. At this time, because more cooling liquid is supplied to the motor with the higher motor temperature, there is no longer a need to provide a needless margin in the temperature specifications of the motors. Also, because effective supply of the cooling liquid is realized, it is sufficient to use the minimum specifications of the pump 72 of the motor cooling system, and the pump 72 can be made smaller.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

For example, (1) In the above-described embodiments, the electric mower was of a mid-mount type in which the mower unit 3 is arranged between the front wheels 11 and the rear wheels 12, but it is also possible to use a front mower type in which the mower unit 3 is arranged in front of the front wheels 11.

(2) In the above-described embodiments, the electric work vehicle was an electric mower, but it is also possible to use another work vehicle, such as a rice transplanter, a tractor, a snow removing vehicle, or the like.

The present invention is not limited to the above described embodiments, and various variations and modifications may be possible without departing from the scope of the present invention.

The present invention can be applied to various types of electric work vehicles with a left-rear wheel that is driven by a left motor and a right-rear wheel that is driven by a right motor.

The invention claimed is:

1. An electric work vehicle comprising:
a left motor that drives a left drive wheel;
a right motor that drives a right drive wheel;
a cooling liquid circulation flow path connected to the left motor and the right motor;
a radiator and a pump disposed on the cooling liquid circulation flow path; and
a cooling liquid distribution mechanism configured to, according to a travel state, adjust a ratio between a cooling liquid flow amount that flows from the pump to the left motor and a cooling liquid flow amount that flows from the pump to the right motor,
wherein the travel state is an inclination angle in a vehicle body transverse direction of a traveling vehicle body, and the cooling liquid distribution mechanism is a distribution valve that makes a cooling liquid flow amount to a motor that drives a drive wheel located on a lower side of an inclination greater than a cooling liquid flow amount to a motor that drives a drive wheel located on an upper side of an inclination.

2. The electric work vehicle according to claim 1, wherein
if the inclination angle is less than or equal to a predetermined angle, the distribution valve keeps the cooling liquid flow amounts to the left and right motors at a predetermined flow amount,
if the inclination angle exceeds the predetermined angle, the distribution valve causes a flow amount that is less than the predetermined flow amount to flow to the motor that drives the drive wheel located on the upper side of the inclination, and
if the inclination angle exceeds the predetermined angle, the distribution valve causes a flow amount that is greater than the predetermined flow amount to flow to the motor that drives the drive wheel located on the lower side of the inclination.

3. The electric work vehicle according to claim 1, wherein the travel state is a motor temperature, and the cooling liquid distribution mechanism is a distribution valve that makes a cooling liquid flow amount to a motor with a higher motor temperature greater than a cooling liquid flow amount to a motor with a lower motor temperature.

4. The electric work vehicle according to claim 3, wherein the cooling liquid distribution mechanism includes a bypass that connects a cooling liquid flow path to the left motor and a cooling liquid flow path from the left motor and connects a cooling liquid flow path to the right motor and a cooling liquid flow path from the right motor, a valve body configured to be displaced to a position of shutting the bypass and a position of opening the bypass, and a temperature response action mechanism that displaces the valve body according to motor temperature.

5. The electric work vehicle according to claim 1, wherein the travel state is a motor load calculated according to a motor current, and the cooling liquid distribution mechanism is a control valve that makes a cooling liquid flow amount to a motor with a higher motor load greater than a cooling liquid flow amount to a motor with a lower motor load.

* * * * *